Dec. 6, 1927.
J. O. BOVING
1,651,749
INJECTOR APPARATUS FOR COMPRESSING GASES
Filed April 24. 1925
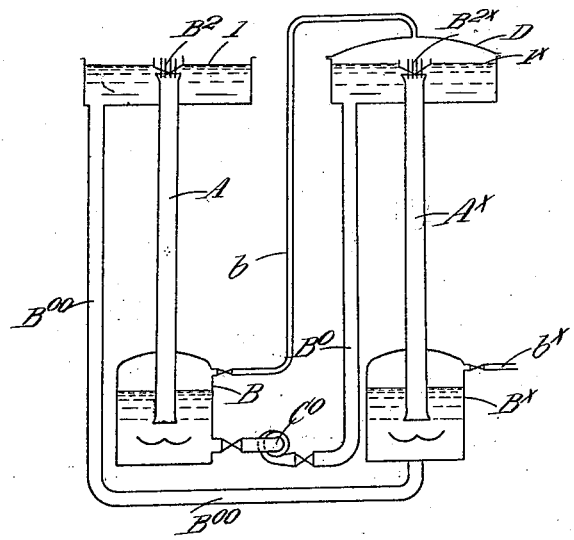
Inventor
Jens Orten Boving
By
Perine, Davis, ...
Attorneys Patented Dec. 6, 1927.

1,651,749

UNITED STATES PATENT OFFICE.

JENS ORTEN BOVING, OF WESTMINSTER, LONDON, ENGLAND.

INJECTOR APPARATUS FOR COMPRESSING GASES.

Application filed April 24, 1925, Serial No. 25,525, and in Great Britain May 15, 1924.

This invention relates to apparatus for compressing a gas entrained in a body of liquid falling by gravity from a high level supply through an induction or compressor conduit to a lower chamber where the compressed gas is released and led to an upper chamber where the compressed gas is entrained in a body of liquid falling by gravity through a second induction or compressor conduit to a second lower chamber where the further compressed gas is released.

According to the invention the gas-deprived liquid from the first lower chamber is raised to the upper chamber by a pump through a conduit and the gas-deprived liquid from the second lower chamber is returned to the high level supply through a pipe by reason of the gas pressure in the latter chamber.

In order that the said invention may be clearly understood and readily carried into effect, the same will now be described more fully with reference to the accompanying drawing which is an elevation illustrating diagrammatically a constructional form of the invention.

A is the induction or compressor pipe leading liquid from the high level 1 to a compressor chamber B having at or near the top a pipe $b$ for leading the compressed air to a closed chamber D and also having at or near the bottom an outlet pipe $B^o$ for the liquid from the chamber B. Above the upper end of the pipe A is an induction head $B^2$ of any known or suitable construction. The liquid pipe $B^o$ enters the lower part of the chamber D and is provided with a centrifugal pump $C^o$ of the necessary capacity and power to deliver the liquid into the chamber D against the pressure of the air therein and this chamber has an induction or compressor conduit $A^x$ leading liquid from the chamber D to a second compressor chamber $B^x$, the said conduit $A^x$ having above its upper end an induction head $B^{2x}$ by which the compressed air in the chamber D is entrained in the liquid falling through the conduit $A^x$ and is then compressed further in the chamber $B^x$, the latter being provided with an outlet pipe $b^x$ for the compressed air. The liquid from the chamber $B^x$ is returned to the high level 1 through a pipe $B^{oo}$ by reason of the air pressure in the chamber $B^x$ which slightly exceeds the pressure due to the head of liquid in the pipe $B^{oo}$.

It will be observed that by reason of the above described apparatus only one pump $C^o$ is required for compressing air in two stages.

The liquid usually employed would be water but as there is no waste of the liquid in the improved apparatus, it is possible to employ liquids other than water that are appropriate for the purpose in view.

What I claim and desire to secure by Letters Patent of the United States is:—

1. Apparatus for compressing gases, comprising in combination a tank for containing liquid, a conduit leading downwards from said tank and serving to entrain gas in the liquid which descends through said conduit, a compressor chamber into which the mixture of liquid and gas discharges from the lower end of said conduit and in which the gas is released from the liquid, a closed chamber arranged above the level of said compressor chamber, a conduit leading the compressed gas from said compressor chamber into said closed chamber, a liquid conduit between said compressor chamber and said closed chamber, a pump for lifting the liquid through the latter conduit into said closed chamber, a conduit leading downwards from said closed chamber and serving to entrain the compressed gas in the liquid which falls by gravity through the latter conduit, a compressor chamber into which the mixture of liquid and compressed gas discharges from the lower end of the latter conduit and in which the compressed gas is released from the liquid, and a conduit through which the liquid from the second compressor chamber is returned to said tank without the aid of a pump by reason of the gas pressure in said second compressor chamber.

2. Apparatus for compressing air comprising in combination an open tank for containing liquid, a conduit leading downwards from said open tank, an induction head at the upper end of said conduit for causing air at atmospheric pressure to be entrained in the liquid solely by the suction or induction effect resulting from the head of liquid in said conduit, a compressor chamber into which the mixture of liquid and air discharges from the lower end of said conduit and in which the air is released from the liquid, a closed chamber arranged above the level of said compressor chamber, a conduit leading the compressed air from said compressor chamber into said closed chamber, a liquid conduit between said compressor chamber and said closed chamber, a pump for lifting the liquid through the latter conduit into said closed chamber, a conduit leading downwards from said closed chamber and serving to entrain the compressed air in the liquid which descends through the latter conduit, a compressor chamber into which the mixture of liquid and compressed air discharges from the lower end of the latter conduit and in which the compressed air is released from the liquid, and a conduit through which the liquid from the second compressor chamber is returned to said tank without the aid of a pump by reason of the air pressure in said second compressor chamber.

JENS ORTEN BOVING.